United States Patent
Menich et al.

(10) Patent No.: US 10,332,134 B2
(45) Date of Patent: Jun. 25, 2019

(54) TRAVEL PRICE OPTIMIZATION (TPO)

(75) Inventors: Ronald P. Menich, Dunwoody, GA (US); Dominic Beveridge, San Francisco, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 13/264,576

(22) PCT Filed: Apr. 14, 2010

(86) PCT No.: PCT/US2010/030977
§ 371 (c)(1),
(2), (4) Date: Jan. 9, 2012

(87) PCT Pub. No.: WO2010/120840
PCT Pub. Date: Oct. 21, 2010

(65) Prior Publication Data
US 2012/0116844 A1     May 10, 2012

Related U.S. Application Data

(60) Provisional application No. 61/168,994, filed on Apr. 14, 2009.

(51) Int. Cl.
*G06Q 10/00* (2012.01)
*G06Q 30/02* (2012.01)

(52) U.S. Cl.
CPC ......... *G06Q 30/0202* (2013.01); *G06Q 30/02* (2013.01)

(58) Field of Classification Search
CPC .. G06Q 10/02; G06Q 10/06375; G06Q 30/02; G06Q 30/0202; G06Q 30/0206; G06Q 30/0283
See application file for complete search history.

(56) References Cited

U.S. PATENT DOCUMENTS 7,657,480 B2    2/2010 Harper
2003/0110066 A1*  6/2003 Walser ............... G06Q 10/04
                                          705/7.31

(Continued)

OTHER PUBLICATIONS

Baker, T. K., & Collier, D. A. (2003). The Benefits of Optimizing Prices to Manage Demand in Hotel Revenue Management Systems. Production and Operations Management, 12(4), 502-518. (Year: 2003).*

(Continued)

*Primary Examiner* — William S Brockington, III
(74) *Attorney, Agent, or Firm* — Spencer Fane LLP; Steven J. Laureanti

(57) ABSTRACT

TPO is an industry-neutral price optimization solution that recommends optimal prices by performing a simultaneous evaluation of all network-wide demand and supply considerations. TPO produces an optimal time-phased price profile designed to achieve the greatest return on inventory. An optimizer technique takes the baseline demand forecasts, competitive intelligence, inventory data, and other related parameters and data representing real-world objects, and determines the optimal prices at which the user will achieve the greatest return on inventory. The optimizer technique can be directed to maximize revenues, profits, or market share. TPO produces a recommended price profile, that can be manipulated in an interactive graphical user interface, and illustrates what price must be charged now, and what prices must be charged later in the booking cycle. Using price sensitive forecasting to estimate how price impacts demand, TPO helps users to maximize revenues, profits, or market share. TPO recommends prices by dated-resources or dated DFUs.

13 Claims, 12 Drawing Sheets

(56) References Cited

U.S. PATENT DOCUMENTS

| | | | |
|---|---|---|---|
| 2003/0130966 A1 | 7/2003 | Thompson | |
| 2004/0267567 A1* | 12/2004 | Barrera et al. | 705/2 |
| 2006/0059028 A1 | 3/2006 | Eder | |
| 2007/0143153 A1 | 6/2007 | Jabr | |
| 2007/0282667 A1* | 12/2007 | Cereghini | G06Q 30/02 705/7.35 |
| 2008/0091480 A1* | 4/2008 | Geoghegan | G06Q 10/02 705/5 |
| 2008/0201273 A1* | 8/2008 | Davis et al. | 705/400 |
| 2009/0030746 A1* | 1/2009 | Etzioni | G06Q 10/02 705/5 |

OTHER PUBLICATIONS

Rajopadhye, M., Ben Ghalia, M., Wang, P. P., Baker, T., & Eister, C. V. (2001). Forecasting uncertain hotel room demand. Information Sciences, 132(1-4), 1-11. (Year: 2001).*

* cited by examiner

| Actions | Recommendations | | | | | | |
|---|---|---|---|---|---|---|---|
| | Sat. 02/14/2010 | Mon. 02/16/2010 | Tue. 02/18/2010 | Wed. 02/17/2010 | Thu. 02/18/2010 | Fri. 02/19/2010 | Sat. 02/20/2010 |
| Date | | | | | | | |
| Previous Rate | $107.22 | $60.99 | $110.00 | $117.22 | $40.00 | $93.07 | $110.00 |
| Live Rate | $163.00 | $175.00 | $202.00 | $400.00 | $95.00 | $75.00 | $160.00 |
| Recommended Rate | $137.22 | $107.77 | $150.00 | $147.26 | $117.86 | $100.07 | $153.99 |
| Status | implemented | implemented | implemented | implemented | implemented | implemented | implemented |
| Rate to Send | $87.22 | $57.72 | $100.00 | $97.24 | $67.88 | $75.07 | $100.00 |

TRAVEL PRICE OPTIMIZATION (TPO)

RELATED APPLICATION DATA

This application claims the benefit of and priority under 35 U.S.C. § 119(e) to U.S. Patent Application No. 61/168,994, filed Apr. 14, 2009, entitled "Travel Price Optimization' and is related to PCT Application No.: PCT/US09/66576, entitled "Market Reference Price Determination System and Method," both of which are incorporated herein by reference in their entirety.

FIELD OF THE INVENTION

One exemplary aspect of this invention generally relates to the field of revenue management and pricing, and more particularly to price-sensitive forecasting and optimization for the purposes of dynamic pricing at least in the fields of hospitality, car rental, passenger transport, air cargo and other related perishable asset industries.

SUMMARY

TPO (Travel Price Optimization) is an industry-neutral or industry agnostic price optimization solution that recommends optimal prices for goods and/or services by performing a simultaneous evaluation of all network-wide demand and supply considerations. TPO produces an optimal time-phased price profile designed to achieve the greatest return on inventory.

An optimization technique utilizes baseline demand forecasts, competitive intelligence, inventory data, and other related parameters and data representing real-world objects, and determines the optimal prices at which the user will achieve the greatest return on inventory. The optimizer can be directed to one or more of maximizing or increasing revenues, maximizing or increasing profits and maximizing or increasing market share.

TPO produces a recommended price profile (which can be optimized" that can be manipulated in an interactive graphical user interface, and illustrates what price must be charged now, and what prices must be charged later in the booking cycle. Using price sensitive forecasting to estimate how price impacts demand, TPO helps users to maximize revenues, profits, or market share.

TPO recommends prices by dated-resources or dated-DFUs (Demand Forecasting Units). The general behavior of the optimization is to recommend a profile of recommended prices, starting at the current days left, and stretching to the consumption start date. As the consumption start date approaches, the optimization subsequently recommends price changes in response to changes in booking levels and competitor prices.

The preceding is a simplified summary of the invention to provide an understanding of some aspects thereof. This summary is neither an exhaustive nor extensive overview of the invention and its various embodiments. It is intended neither to identify key or critical elements of the invention nor to delineate the scope of the invention, but to present selected concepts of the invention in a simplified form as an introduction to the more detailed description presented below. As will be appreciated, other embodiments of the invention are possible utilizing, alone or in combination, one or more of the features as set forth above or described in detail below.

BRIEF DESCRIPTION OF THE FIGURES

The exemplary embodiments of the invention will be described in detail, with reference to the following figures, wherein:

FIGS. 3-12 illustrate exemplary user interfaces associated with the price determination system according to this invention.

DETAILED DESCRIPTION

Figure 1:
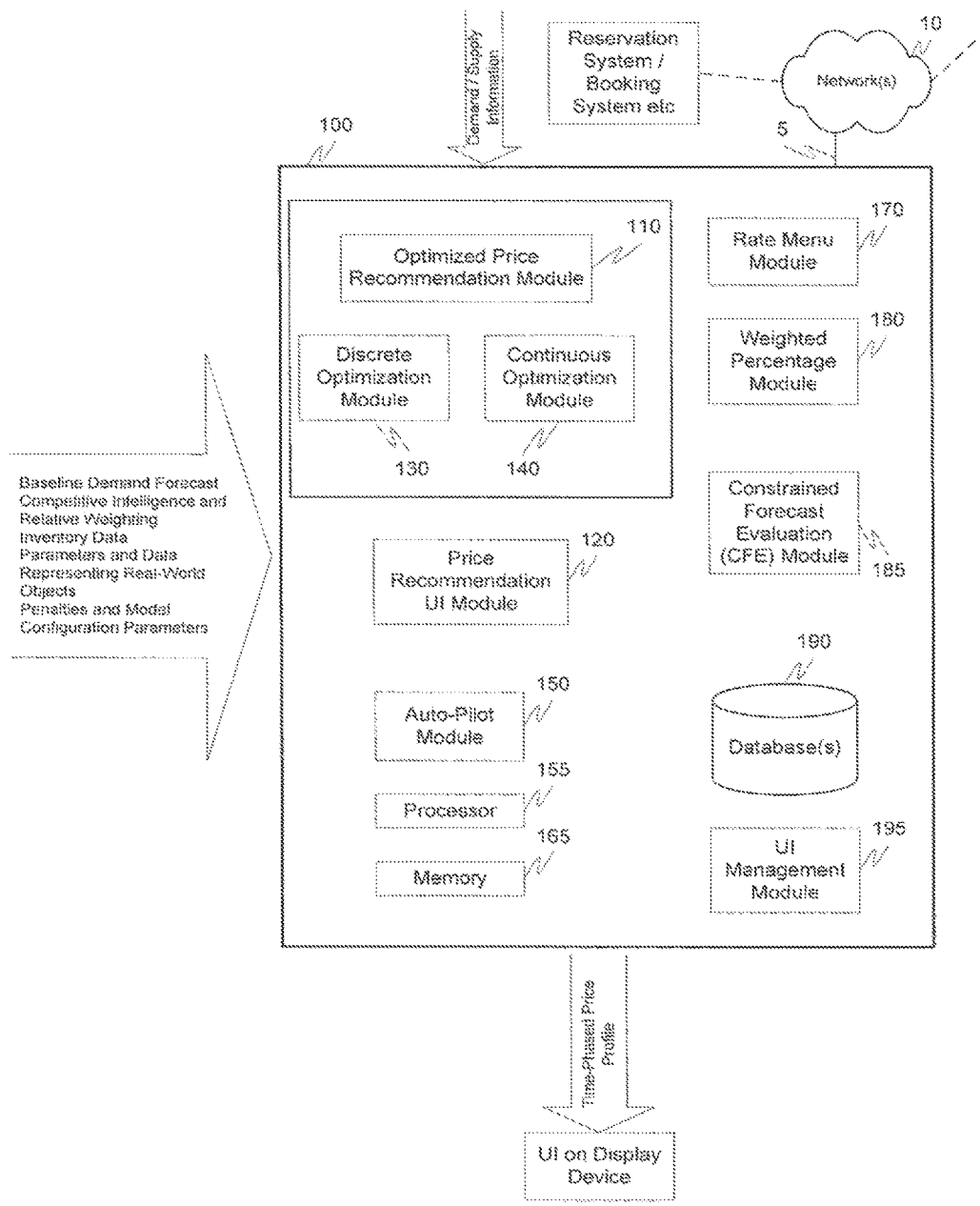
FIG. 1 illustrates an exemplary price determination system according to this invention.

The exemplary embodiments of this invention will be described in relation to a price optimization system, as well as, techniques and methods to determine an industry neutral price optimization solution. However, it should be appreciated, that in general, the systems and methods of this invention will work equally well for other types of data and for other types of forecasting or optimization in a plurality of environments and/or industries.

The exemplary systems and methods of this invention will also be described in relation to a price optimization determination architecture, and associated communications, hardware, data structure and feeds and software component(s). However, to avoid unnecessarily obscuring the present invention, the following description omits well-known structures and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured, and/or encrypted system.

Thus, it should be appreciated that the components of the system can be combined into one or more devices or collocated on a particular node(s) of a distributed network, such as a distributed network. As will be appreciated from the following description, and for reasons of computations efficiency, the components of the systems can be arranged at any location within a distributed network without affecting the operation thereof. For example, the various components can be located with a forecast, optimization or sales suite of products, or some combination thereof. Similarly, one or more functional portions of this system could be distributed between a computing device and a server.

Furthermore, it should be appreciated that the various links, including the communications channels connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute, and variations thereof, as used herein are used interchangeably and include any type of methodology, process, technique, mathematical operation or protocol.

The term "automatic" and variations thereof as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

However, it is to be appreciated that the techniques and concepts herein can be extended to any industry including rail, cargo, air cargo, rental car, etc, and in general any perishable asset goods/services industries.

The database and memory data models behind TPO's processing are phrased in terms of resources, packages, Demand Forecasting Units (DFUs), and other entities which are not specific to any particular industry vertical (for example: hospitality, car rental, or passenger rail, etc.).

The key business entities are as follows but as mentioned above it is to be appreciated that in general other attributes could also be used:

| Entity | Description | Exemplary Attributes in Hospitality | Exemplary Attributes in Passenger Rail | Exemplary Attributes in Air Cargo | Exemplary Attributes in Rental Car |
|---|---|---|---|---|---|
| TPO DFU | Basic forecasting unit in TPO | Property; arrival date; length-of-stay; rate category; room type | Train; departure day; route; market segment; cabin | Flight; departure day; origin-destination; product | Rental location; pick-up day; length-of-rent; fare tier; care class |
| Resource | An object that has physical capacity | Property; stay night; room type | Train; departure day; leg; cabin | Flight; departure day; leg; weight (volume); capacity | Rental location; pick-up day; car class |
| Package | A collection of resources that a customer requests | Property; arrival date; length-of stay; room type | Train; departure day; route; cabin | Flight; departure day; origin-destination; route | Rental location; pick-up day; length-of-rent; car class |

The terms "computer-readable medium" and computer-readable storage medium as used herein refer to any non-transitory tangible storage and/or transmission medium that participates in providing instructions to a processor for execution. Such a medium may take many forms, including but not limited to, non-volatile media, volatile media and transmission media. Nonvolatile media includes, for example, NVRAM, or magnetic and/or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes or deformation, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art recognized equivalents and successor media, in which the software implementations of the present invention are stored.

Also, while the invention is described in terms of exemplary embodiments, it should be appreciated that individual aspects of the invention can each be separately claimed.

The setting in which one exemplary embodiment of the invention operates in the hospitality industry is as follows.

The exemplary price-sensitive demand model within TPO expresses demand as a linear function of a price increment ratio. The price increment ratio is the percentage difference between the own price and the reference price. In most intended applications of TPO, the reference price is populated as a market price, which constitutes a weighted average of competitive rates. TPO enables the use of other competitive rate summarization metrics besides the standard weighted average; for example, use of a specified percentile of the distribution of the competitive rates as a summary metric is supported. Therefore, TPO's price-sensitive demand model enables demand to change as a function of both own-price and competitive price.

Own-elasticity: Percentage change in the quantity demanded for a DFU for a one percent change in that DFU's price. The elasticity value that indicates how a change in the DFU's price is likely to affect its demand.

Cross-elasticity: Percentage change in the quantity demanded for a DFU for a one percent change in another DFU's price. The elasticity value that indicates how a price change for the impacting DFU is likely to affect the sales quantity of the impacted DFU.

Market Reference Price: A value computed from the competitive rate shopping data, which is used in price sensitive forecasting and optimization.

For hospitality stay-night pricing, TPO runs a continuous optimization that recommends floating-point prices, which means that TPO may recommend, for example, $53.1542 or $82.196 or any other price. For Passenger Rail, TPO can recommend a price from amongst a set of pre-specified price points. For example, the optimizing technique can select a price from amongst a discrete set of alternatives {$69, $79, $89}.

TPO's discrete price point optimization capability is an extension of its continuous optimization features developed for the hospitality stay-night price, rather than a replacement for those features. For example, the linear demand-price model within the TPO can be preserved in the discrete price point extension of TPO.

TPO can also optimize both resources and packages of resources. For example, TPO can be configured to either recommend prices at the resource level (for example: the stay night level for hospitality at the NPO_RESRC_DT level) or at the package level (for example: the (arrival date, LOS) level in Hospitality, at the NPO_PKG_DT level).

NPO_RESRC_DT: This table stores the key input and output information for the optimizing, for a dated-resource.

NPO_PKG_DT: This table stores the information pertinent to a dated package.

In addition, penalties that control the proximity of recommended prices and current prices can be adjusted. For example, TPO includes penalty values which can be adjusted to make the optimizing either more or less reluctant to move recommended prices away from the current prices. These penalties, PRICE_INCREASE_PENALTY and PRICE_DECREASE_PENALTY (in the NPO_RESRC_CAL_PARAM database table) allow for asymmetric punishment of recommendations that are higher or lower than the current price.

For example, the solution can be configured to be very hesitant to take price decreases when significant numbers of bookings on hand are already present. This approach can help the business user limit the cancel/rebook behavior. Similarly, when bookings on hand are low, the solution can be configured to be quite willing to take price changes in either direction, up or down.

TPO_NPO RESRC_CAL_PARAM: This table stores information on the season specific resource parameters.

PRICE_DECREASE_PENALTY: Penalty associated with recommending a price lower than the current selling price.

PRICE_INCREASE_PENALTY: Penalty associated with recommending a price higher than the current selling price.

The concept of a rate menu can also be internalized. For example, rate menu is a list of all the rates that can potentially be booked, along with a specification of the relationship between the rates. TPO understands relative pricing, that is, situations in which the price of one product is a function of the price of another. In the hospitality context, a customer might qualify for a 10% discount off the normal selling rate by virtue of being an employee of a certain company or member of a certain organization.

The TPO recommends the selling rate, and TPO understands that other prices may be pegged to be equal to 10% off that selling rate, and that demand in that segment responds to a price that is 10% off the selling rate. These price menu relationships are specified in the MENU_OFFSET_TYPE and OFFSET_VAL columns of the NPO_RESRC_BKT_PARAM database table.

NPO_RESRC_BKT_PARAM: This table stores information pertinent to a dated-resource and bucket.

MENU_OFFSET_TYPE: One of the multiplicative, additive, or non-menu type.

OFFSET_VAL: Adjustment value applied to the combination of the resource prices, to arrive at the TPO DFU price.

Some of the exemplary features of the Travel Price Optimization (TPO) User Interface (UI) are as follows:

Generates an optimal recommended price profile constituting of different prices to be implemented between the current days left and the consumption start date.

Provides floating point price recommendations at different aggregation levels.

Facilitates pricing decisions for all days in the forecast horizon, not just the busiest ones.

Models the competitor rate data in the core of the optimization.

Understands how demand responds to changes in price—own and cross-product elasticities.

Allows users to base decisions on demand, remaining availability, and their position relative to their competitors.

Allows users to eliminate their least profitable future bookings by predicting the unconstrained demand.

Allows users to specify how price recommendations are prioritized into High, Medium, and Low priority levels.

Provides auto-pilot capability, which allows users to select the recommendations (based on their priority level) for automated upload to the Central Reservation System (CRS).

Allows users to assign a weighting percentage for each competitor resource, which is used to compute a Market Reference Price.

Allows users to set the rate threshold values and the maximum and minimum absolute price boundaries, for the recommended rates.

Provides a Constrained Forecast Evaluation (CFE) simulation process, subsequent to the optimization. CFE simulates in detail the implementation of the price recommendations to arrive at a more realistic projection for revenues and total bookings.

In accordance with an exemplary embodiment, FIG. 1 illustrates an exemplary price determination system 100. The price determination system 100 comprises an optimized price recommendation module 110, a price recommendation user interface (UI) module 120, a discrete optimization module 130, a continuous optimization module 140, an auto-pilot module 150, processor 155, memory 165, rate menu module 170, weighted percentage module 180, CFE module 182, database(s) 190 and UI management module 195.

In operation, the price determination system 100 receives, optionally via one or more networks 10 and links 5, from one or more information sources, demand and supply information. Then, and based on one or more of baseline demand forecast(s), competitive intelligence, inventory data, parameters and data representing real-world objects, a time-phased price profile is determined and output.

For example, and in accordance with a first exemplary embodiment, the optimized price recommendation module 110 determines an optimal price to one or more of maximize revenues, profits or market share. For example, and via an input device (not shown) and an associated user interface on the display device, a user selects which type of optimal price they would like. The optimized price recommendation module 110 operates based on an optimization technique that utilizes mathematical programming. Mathematical programming encompasses a wide variety of methods including one or more of linear programming, integer programming, quadratic programming" and the like, all of which can be used with the techniques disclosed herein. Problems that are solved using math programming include an objective function (profit, cost, market share) that is either maximized or minimized subject to certain mathematical and business constraints. The variables in the model are the decisions that the math programming model needs to make. The optimized price recommendation module 110 utilizes a quadratic program in that the objective includes the maximization of revenue which is modeled as a quadratic function of price. The solving of the can optionally be done by a third-party solver such as IBM's®CPLEX, Lindo's® Optimization products, or the like, or in general any third party solver.

The optimized price recommendation module 110 then determines an optimal recommended price profile that is stored in database 190 and with the cooperation of the UI management module 195 generates an optimal price profile which is the price to charge for a service today and all days into the future.

For instance, based on the (configurable) horizon, the optimized price recommendation module 110 will recommend an optimal price profile for a future stay night at a hotel, starting today and all subsequent days leading up to that future date. What is normally executed in the reservation system (not shown) is the current recommendation for that future service date but the optimized price recommendation module 110 in turn generates a fully optimized price trajectory that can be displayed on an appropriate UI. The optimized price recommendation module 110 does so based on an objective function criteria specified (maximize revenue or market share, etc.)

The penalties and model configuration parameters can then be utilized by the system to weigh penalties into the recommended price determination. For example, math programming models can have penalties built into the objective function to allow for trade-offs between the primary metric (revenue, profit, etc.) and violations to certain business constraints. In the optimized price recommendation module 110, there are certain rules, called the rate-menu which is managed by the rate menu module 170, that govern how other prices should be established vis-a-vis the standard rack rate that the optimized price recommendation module 110 generates. It is possible however that these rules cannot always be satisfied and thus it is important to generate an optimal price that minimizes the deviations from these rules. The extent of the permissibility of these rate-menu violations is controlled through a penalty scheme—a small penalty allows for the optimized price recommendation module 110 to price based on the primary metric where as a large penalty forces the system to adhere to the rules at the expense of the primary metric.

The optimized price recommendation module 110 is also capable of modeling competitor rate data. More specifically, competitor rates are modeled into the optimized price recommendation module 110 via the technology described in the related market reference price application. The market reference price modules takes the individual competitor prices and combine them into a single market reference price based on the relative weights of the competitors and with the cooperation of the weighted percentage module and the algorithm of choice (e.g., weighted average, $k^{th}$ percentile, etc). The optimized price recommendation module 110 then generates an optimal price recommendation relative to the market reference price.

As mentioned above, the system is also capable of providing a constrained forecast evaluation simulation process. The Constrained Forecast Evaluator (CFE) is a post-optimization discrete event simulator that provides the ability to compare the expected bookings and revenue at current price profiles vs. TPO's optimized price profiles. CFE, via the CFE module 185 takes the on hand bookings, forecasts and price-sensitivity measures and runs a discrete event simulation to accept bookings to come at each price profile given the available capacity. Through CFE, any constraints that might only have been partially satisfied in the optimization can be more rigorously enforced as bookings arrive against constrained capacity. Likewise, CFE gives the opportunity to simulate the outcome of continuing to sell at the current prices with limited available inventory.

The auto-pilot module 150 provides auto-pilot capability, which allows users to select the recommendations (based on their priority level) for automated upload to, for example, a Central Reservation System (CR5), or the like. The data from the auto-pilot module can be saved in, for example, a standard file format to facilitate the integration onto the CR5.

For some types of pricing, the optimized price recommendation module 110 can run a continuous optimization (with the cooperation of the continuous optimization module 140) that recommends floating-point prices, which means that the TPO may recommend, for example, $53.1542 or $82.196 or any other price. Looking at one specific exemplary embodiment for passenger rail, the TPO can recommend a price from amongst a set of pre-specified price points. For example, the optimizing technique can select a price from amongst a discrete set of alternatives {$69, $79, $89}.

TPO's discrete price point optimization capability is implemented with the cooperation of the discrete optimization module 130 and, as discussed, an extension of the continuous optimization features developed for the hospitality stay-night price, rather than a replacement for those features. For example, the linear demand-price model within the TPO can be preserved in the discrete price point extension of TPO.

TPO can also optimize both resources and packages of resources. For example, TPO can be configured to either recommend prices at the resource level (for example: the stay night level for hospitality at the NPO_RE5RC_DT level), or at the package level (for example: the (arrival date, LOS) level in Hospitality, at the NPO_PKG_DT level).

Figure 2:
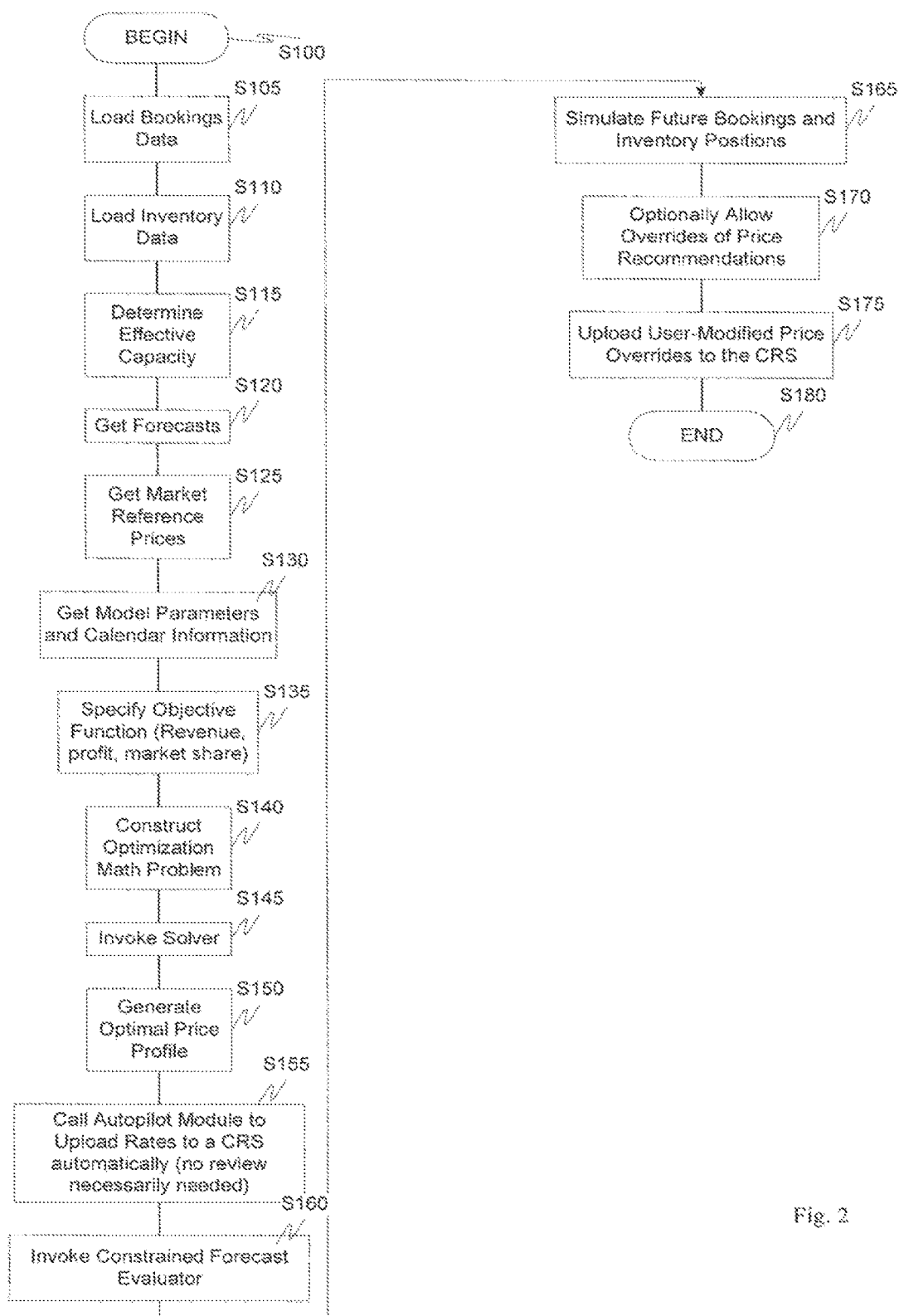
FIG. 2 is a flowchart illustrating an exemplary method of operation of this invention.
Figure 5:
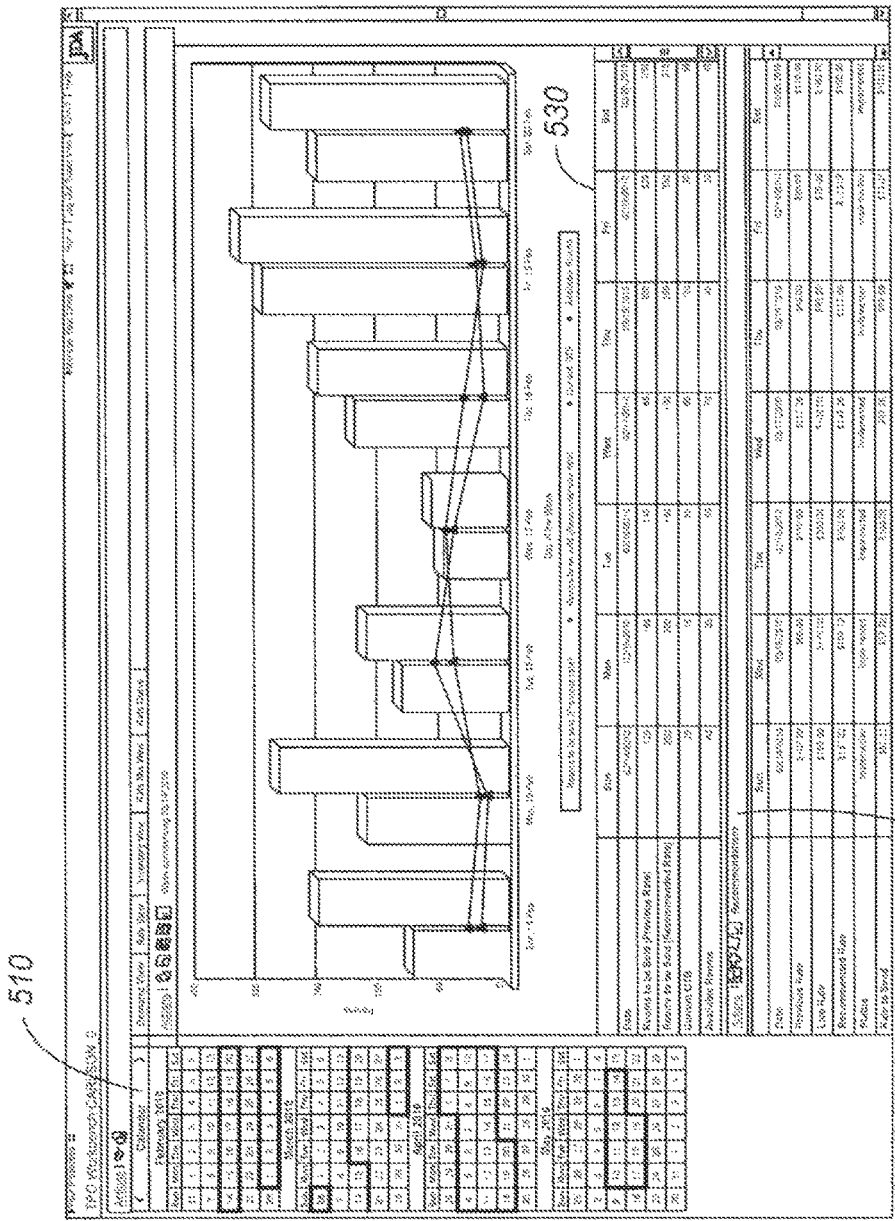

FIG. 2 outlines an exemplary method of operation of the price determination system. In particular, control begins in step 5100 and continues to step 5105. In step 5105, bookings data is loaded from, for example, one or more reservation systems/booking systems. Next, in step 5110, inventory data is also loaded from, for example, from one or more reservations/booking systems. Then, in step 5115, an effective capacity is determined. Control then continues to step 5120.

In step 5120, one or more forecasts, such as baseline demand forecast are retrieved. Next, in step 5125, market reference prices are retrieved, for example, from the output of the co-pending application directed toward the market reference price system. Then, in step 5130, model parameters and calendar information are retrieved. Control then continues to step 5135.

In step 5135, an objective function is specified, such as revenue, profit, market share, or the like, via input received by a user. Next, in step 5140, the optimization math problem is constructed and in step 5145 the solver invoked. As discussed, the solver can be a third-party solver such as IBM's® CPLEX or Lindo's® Optimization Products, or the like. Control then continues to step 5150.

In step 5150, an optimal price profile is generated and optionally displayed in a user interface on a display. Next, in step 5155, the autopilot module is called to upload rates to a central reservation system, or the like, automatically with no reviewing of the rates necessarily needed. Then, in step 5160, the constrained forecast evaluator simulation process is invoked that simulates in detail the implementation of the price recommendations to arrive at a more realistic projection for revenues and total bookings Control then continues to step 5165.

In step 5165, future bookings and inventory positions are assimilated with in step 5170 the overriding of price recommendations being allowed. For example, a user, via an appropriate interface and input device, can override one or more of the price recommendations based on, for example, user specific knowledge, business requirements, company objectives, predicted activity(ies), or in general any criteria. Then, in step 5175, the one or more user user-modified price overrides can be uploaded to, for example, a central reservation system. Control then continues to step 5180 where the control sequence ends.

FIGS. 3-12 illustrate exemplary user interfaces designed to assist users with revenue management tasks. In accordance with one exemplary goal, revenue management can be accomplished in less than 30 minutes per day. More specifically, the exemplary user interfaces are engineered to be implemented in, for example, a franchise hospitality environment. This entails a very broad user community, with individuals representing numerous levels of experience, expertise, and include many who: do not belong to a centralized revenue management group, have received minimal training in revenue management, have many other jobs besides revenue management to perform in the course of a day and may not necessarily talk to other operators about revenue management with great frequency.

With this in mind, one exemplary aspect of this invention is designed as a brand new user experience, intended to deliver a price revenue process that is radically simpler than the existing revenue management workflows. The various exemplary user interfaces illustrated herein have been designed from the ground up, with the intention of providing only information that is helpful to users in reviewing their rate recommendations. One exemplary theme of the user interface is revenue management in 30 minutes per day. With this in mind, users are asked on a daily basis to review a 120 day calendar and review recommendations for weeks when exceptional recommendations have been made, and where necessary, accept, reject, or change the recommended rate. Users are also asked to review all rates for upload. The user interface screens for each of the above activities are illustrated hereinafter.

More specifically, FIG. 3 is an exemplary recommendation pane user interface where users are presented with a single selling rate per stay night for a selected period of 7 days at a time, starting Sunday. On the same screen, multiple configurable views of supporting data are available, which will be described hereinafter. The recommendation pane in FIG. 3 includes date information 310, previous rate information 320, live rate information 330, recommended rate information 340, status information 350 and rate to send information 360, all organized in a table by date 370.

Figure 4:
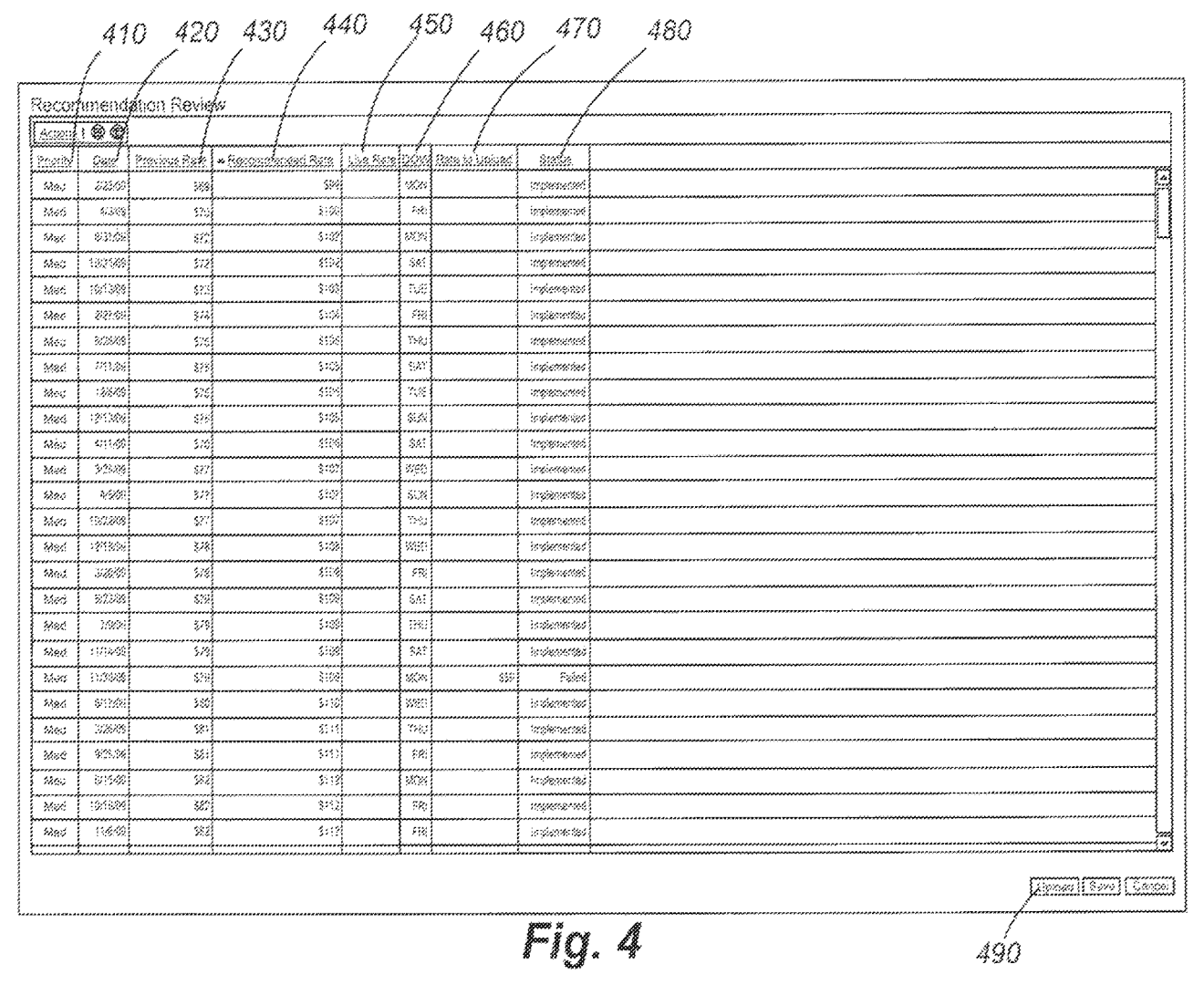

The recommendation review interface illustrated in FIG. 4 provides the user with a complete list of the stay night prices for the booking horizon. This can also be the final review screen before the user uploads the optimal rates to, for example, a CRS. The recommendations review interface includes priority information 410, date information 420, previous rate information 430, recommended rate information 440, live rate information 450, day of week information 460, rate to upload information 470, and status information 480. As can be seen, the status information indicates that most of the rate implementation has been implemented, however one rate has failed. Also provided are selectable buttons, such as upload button 490 that allows the user to upload the recommended rates to, for example, a CRS.

As discussed, one exemplary goal is to provide a simplified workflow that allows revenue management. In accordance with a first step, and associated with the user interface illustrated in FIG. 5, the user is asked to review a 120 day calendar and review recommendations for weeks when exceptional recommendations have been made, and where necessary, accept, reject, or change the recommended rate. More specifically, this activity can be carried out using the weekly view screen illustrated in FIG. 5, which is divided into three sections: 1) a calendar 510 that highlights days when the rate recommendations attract a high, medium, or low priority, 2) a recommendations pane 520 that allows users to review and override price recommendations, and 3) the supporting data pane 530 provides users with the view of supporting data that they find the most useful in reviewing their recommendations.

Figure 6:
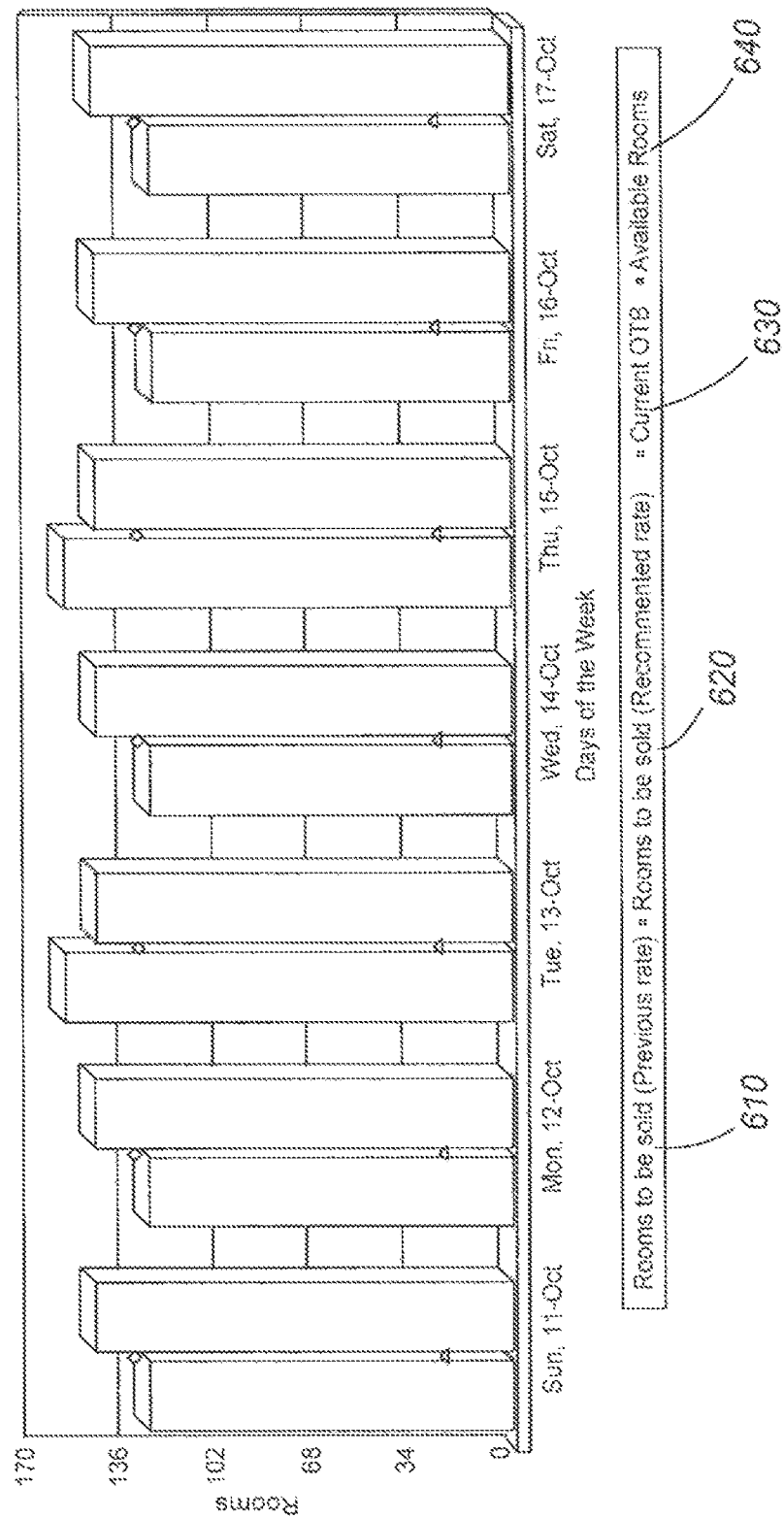

FIG. 6 illustrates an exemplary demand view user interface that provides users with a simple indication of the price sensitive forecast, i.e., the total demand at the previous rate 610 compared to the demand at the recommended rate 620, or, for example, the seven day period selected on the calendar. In this interface, and for each day, the left hand columns illustrate the rooms to be sold at the previous rate, with the right hand columns illustrating the rooms to be sold at the recommended rate. Also available, is information relating to the number of available rooms 640, and current OTB 630 (Open-To-Buy).

Figure 7:
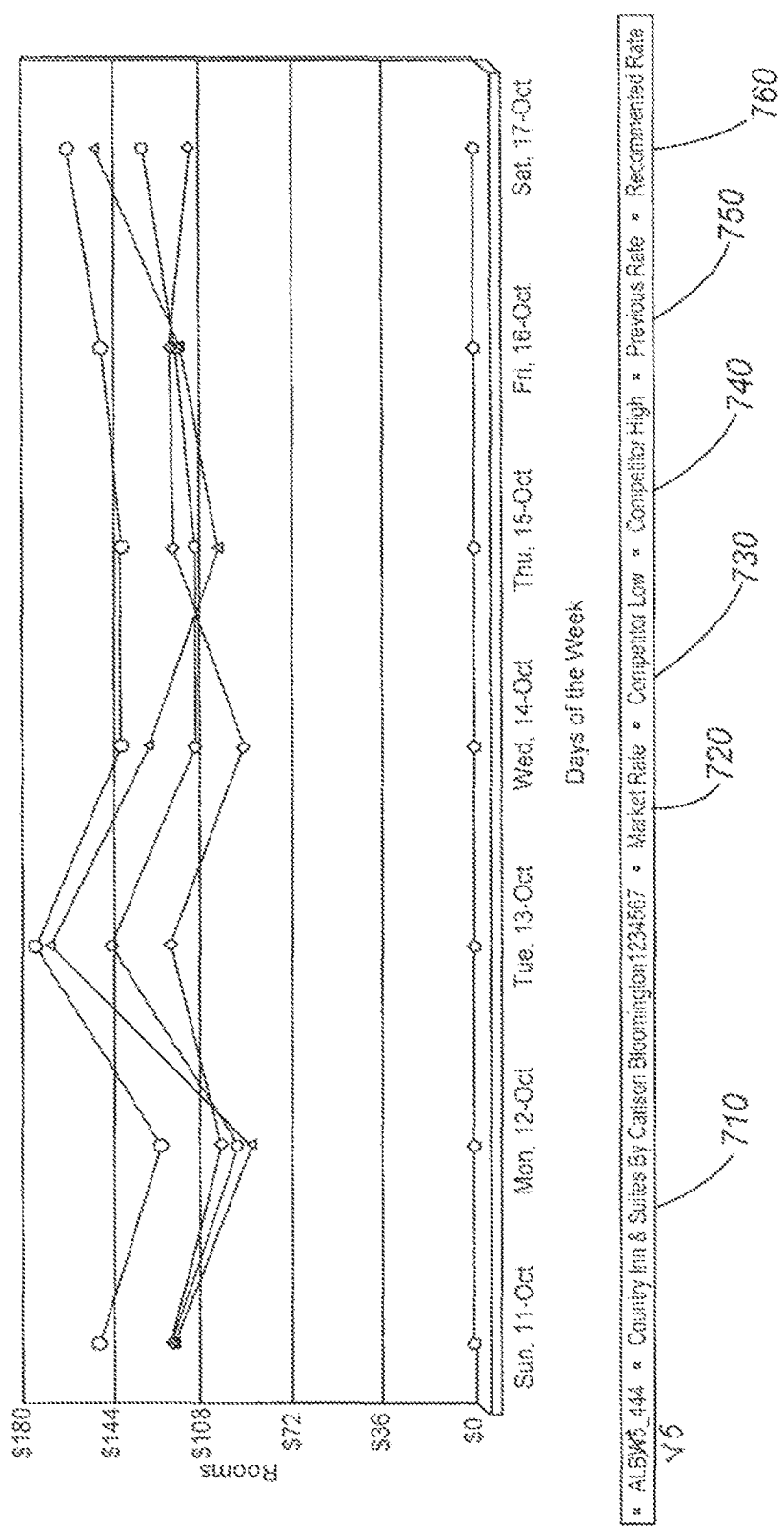

The rate view user interface illustrated in FIG. 7 provides users with a simple way to compare their rate recommendations with those of their competitors 710, or the previous rate 750 for, for example, a hotel before the optimization produced the new recommendations for the seven day period selected on the calendar. Exemplary information included in the rate review interface includes competitor data 710, market rate information 720, competitor low 730 and high 740 rate information, previous rate information 750, and recommended rate information 760 for, for example, the one week period selected on the calendar.

Figure 8:
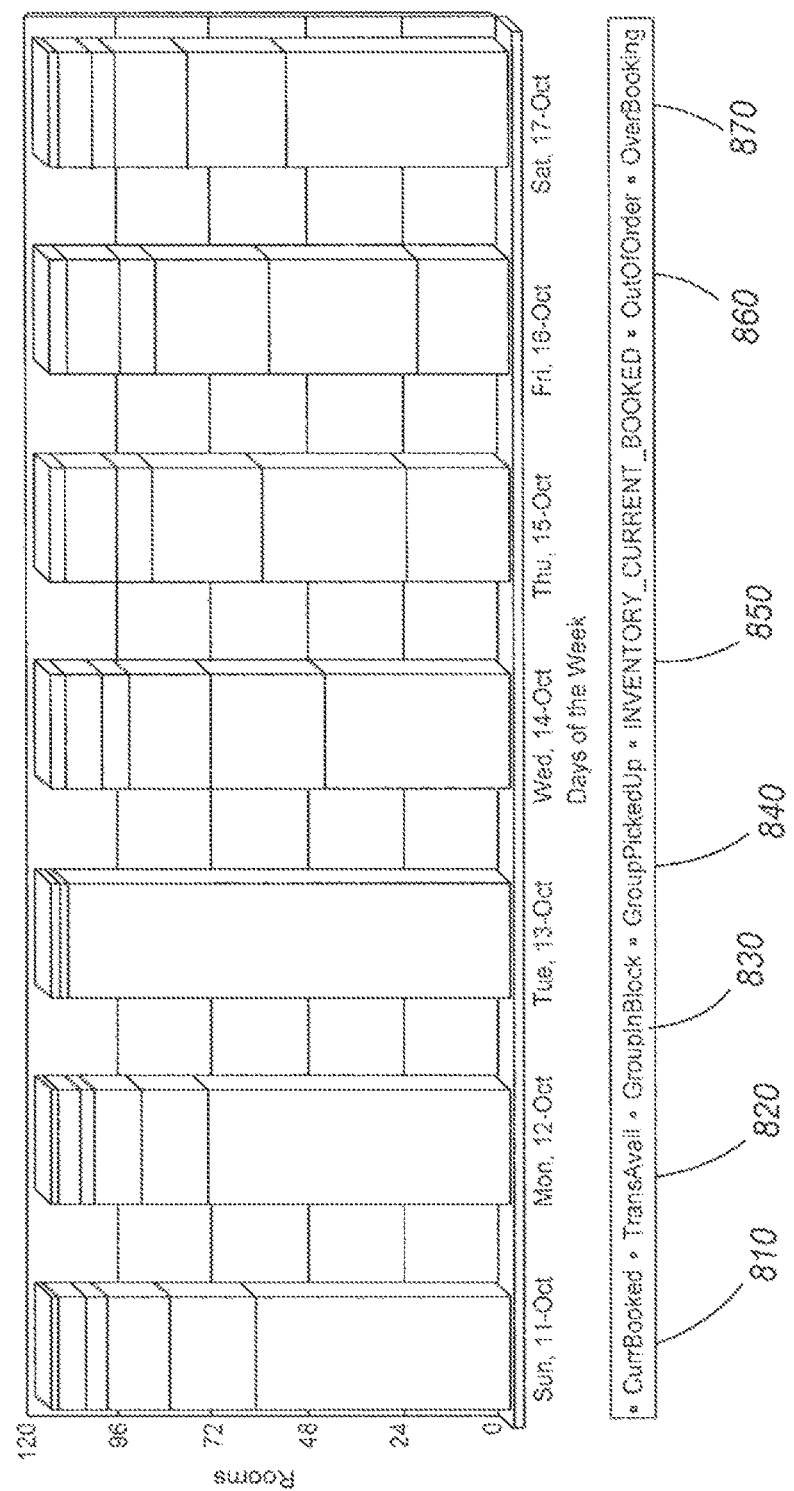

FIG. 8 illustrates an exemplary inventory view interface that provides users with a sample view of the inventory status of their "rooms" for the seven day period selected on the calendar. For example, the interface can include information such as currently booked information 810, transfer available information 820, group in block information 830, group picked up information 840, inventory currently booked information 850, out of order information 860, and overbooking information 870.

Figure 9:
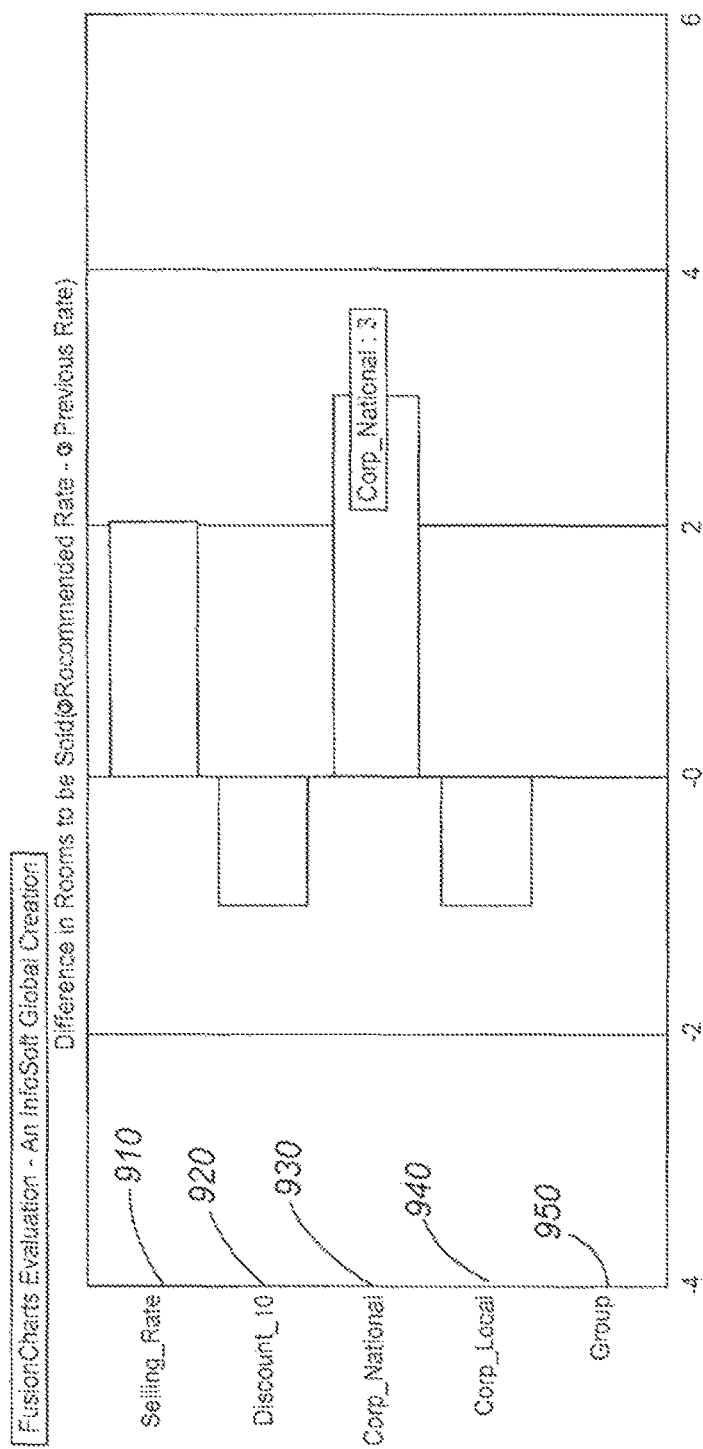

FIG. 9 illustrates an exemplary rate mix view user interface that provides users with a simple view of the predicted change in the sales mix that could result from changing the price to the recommended rate. In this case, the sales mix is defined as the proportion of each stay night's sales that could come from each of a set of pre-defined customer or rate segments. As illustrated, the exemplary user interface includes selling rate information 910, discount information 920, corporate national information 930, corporate local information 940, and group information 950.

Figure 10:
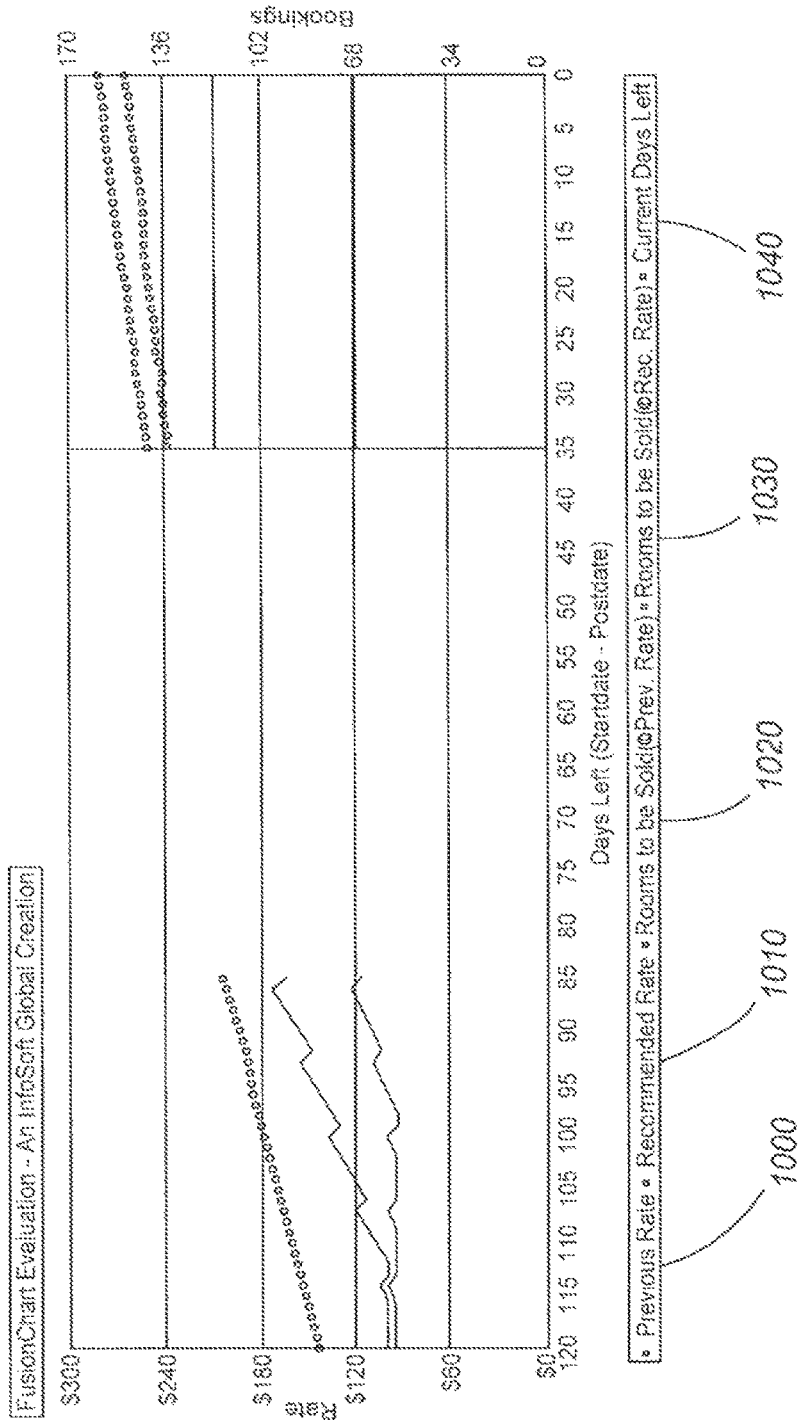

FIG. 10 illustrates an exemplary rate curve interface that shows the direction that the recommended price profile and associated expected trajectory of bookings is expected to follow between today's date and the arrival date. This is a unique function of the current technology that can be very useful as a tool to support data for hotels attempting to decide whether or not to accept a rate recommendation for a date in the future. In this exemplary interface, previous rate information 1000, recommended rate information 1010, rooms to be sold at a previous rate information 1020, rooms to be sold at a recommended rate information 1030, and current days left 1040 are displayed on the chart.

The next step for the user is to review all rates for upload. More specifically, the rates selected for upload are summarized in the recommendation review screen illustrated in FIG. 11. This provides a simple, configurable spreadsheet-like view of recommendations, which allow users to make further changes if required, or, for the more experienced user, provides a faster alternative means for reviewing a day's recommendations. Similar to the recommendation user interface described previously, the review rates interface includes priority information 1100, date information 1110, previous rate information 1120, recommended rate information 1130, live rate information 1140, day of week information 1150, rate to upload information 1160, status information 1170, and a window 1180 that confirms that the rates are supposed to be uploaded.

Figure 11:
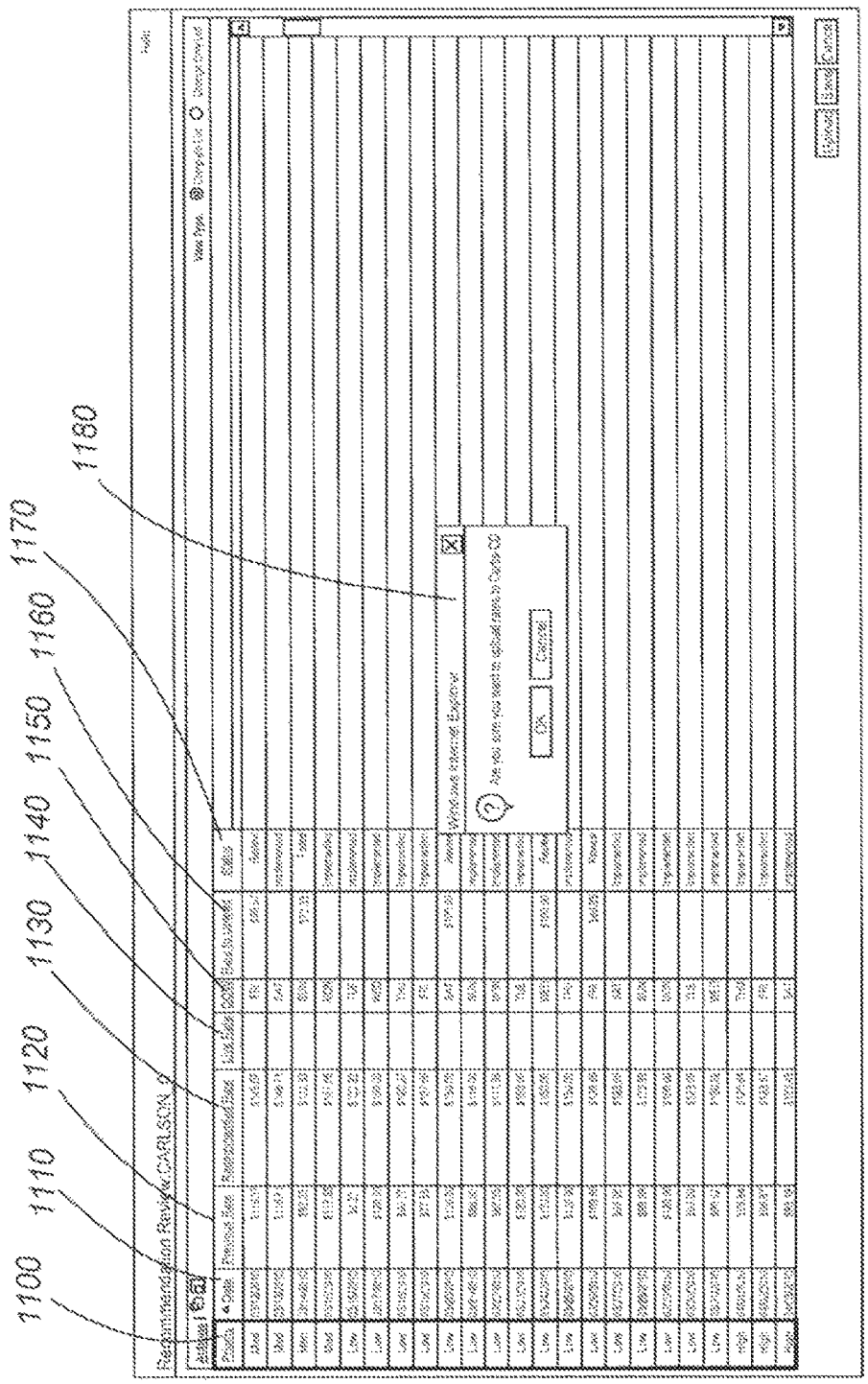
Figure 12:
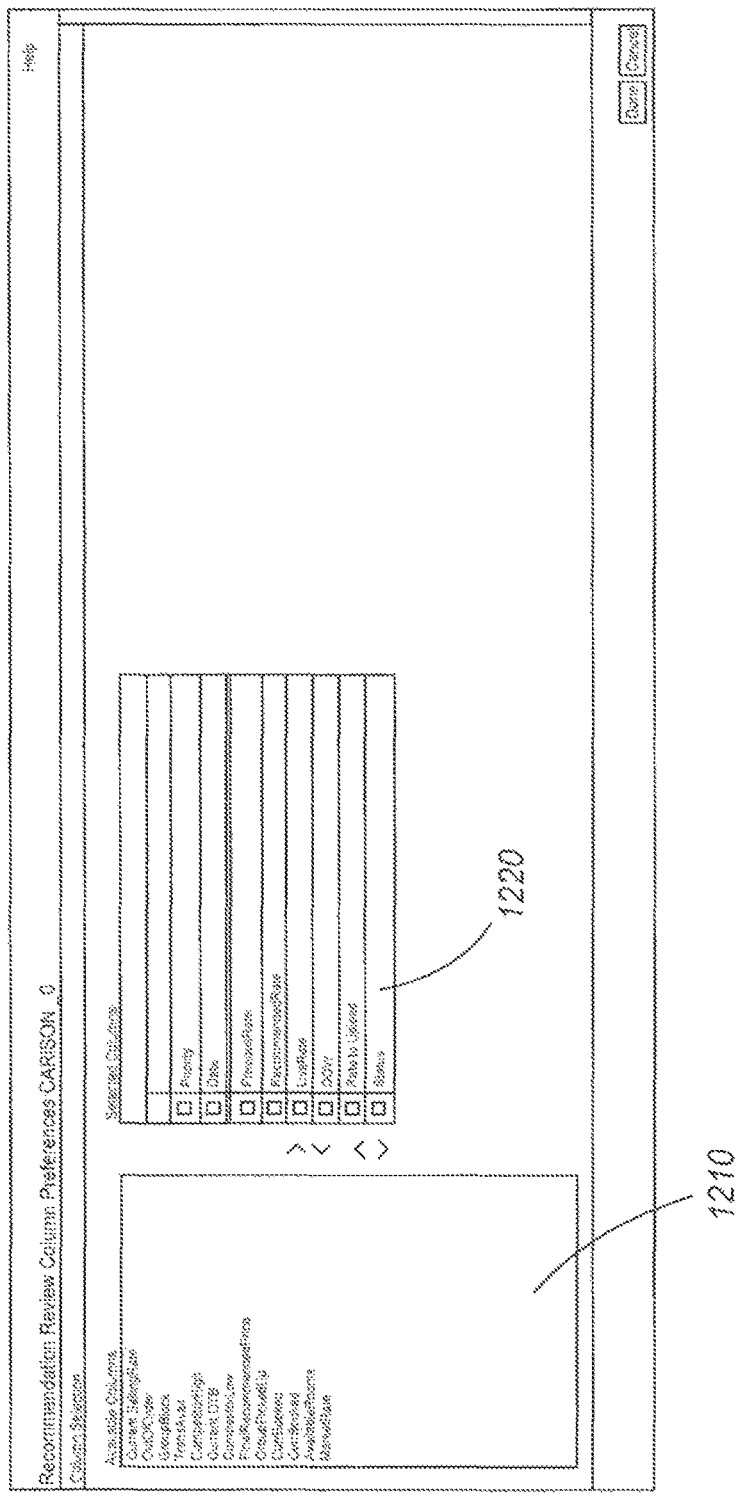

FIG. 12 illustrates an exemplary user interface that allows configuration of the recommendation review interface shown in FIG. 11. For example, portion 1210 shows the available columns that can be displayed such as: current selling rate, out of order, group and block, transfer available, competitor high, current OTB, competitor low, final recommended price, group picked up, currently booked, over booked, available rooms, and market rate. The selected columns portion 1220 illustrates to the user the one or more columns that have been selected. As will be appreciated, comparable configuration interfaces can be provided for any of the user interfaces displayed herein that allow, for example, reorganization, changing of colors, and in general any of the standard customization options that allow a user to manipulate the user interfaces.

The exemplary systems and methods of this invention have been described in relation to databases, data analysis, data processing, price determinations and data structures. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific details set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated that the components of the system can be combined into one or more devices, or collocated on a particular node of a distributed network, such as an analog and/or digital communications network, a packet-switch network, a circuit switched network or a cable network.

It will be appreciated from the preceding description, and for reasons of computational efficiency, that the components of the system can be arranged at any location within a distributed network of components without affecting the operation of the system. For example, the various components can be located in an analytical data tool and/or expert data analysis system.

Furthermore, it should be appreciated that the various links (which may or may not be illustrated), connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowchart has been discussed and illustrated in relation to a particular sequence of events, it should be appreciated that changes, additions and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, enterprise systems, demand chain management systems, handheld devices, and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer(s) with the cooperation of a controller and memory, a special purpose computer, a microprocessor, or the like. In these instances, the systems and methods of this invention can be implemented as program embedded on personal computer such as an applet, JAVA® or CGI script, or the like, as a resource residing on a server or computer workstation, as a routine embedded in a dedicated measurement system, system component, or the like. The system can also be implemented by physically incorporating the system and/or method into a software and/or hardware system.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above.

This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate exemplary embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A computer-implemented method, comprising:
receiving bookings data, inventory data, capacity data, forecast data, current prices, and competitor rate data in market reference prices over a communications network from one or more reservation systems;
receiving one or more model parameters and one or more penalties that control a proximity of a price recommendation over the communications network from the one or more reservation systems, the one or more model parameters including one or more of a baseline demand forecast, competitive intelligence, relative weighting, inventory data, data representing real-world objects, and model configuration parameters;
receiving one or more business objectives over the communications network from the one or more reservation systems, the one or more business objectives including one or more of a return on inventory, revenue, profits, and market share;
determining industry-agnostic optimized price recommendations for a specific configurable time period at a resource level or a package of resources level based on the one or more model parameters, the one or more penalties, the one or more business objectives, and the market reference prices;
selecting one or more of the optimized price recommendations for the specific configurable time period;
determining a price profile based on the selected one or more optimized price recommendations for the specific configurable time period;
automatically uploading recommended rates based on the price profile over the communications network to the one or more reservation systems;
invoking a constrained forecast evaluator subsequent to the determining optimized price recommendations and automatically uploading recommended rates, wherein the constrained forecast evaluator takes the bookings data and the forecast data and simulates accepting the bookings data at the current prices and the selected one or more optimized price recommendations based on available capacity;
comparing, through the constrained forecast evaluator, expected bookings and the one or more business objectives at the current prices with the price profile based on the selected one or more optimized price recommendations for the configurable time period;
overriding the optimized price recommendations subsequent to review of the constrained forecast evaluator simulation, wherein the overriding is based on criteria comprising specific knowledge, business requirements, the one or more business objectives, and predicted activities; and
uploading the overridden optimized price recommendations to the one or more reservation systems.

2. The computer-implemented method of claim 1, further comprising invoking the constrained forecast evaluator and simulating an implementation of the selected one or more optimized price recommendations to arrive at a projection for revenues and total bookings.

3. The computer-implemented method of claim 1, further comprising simulating future bookings and inventory positions.

4. The computer implemented method of claim 1, wherein the optimized price recommendations are for one or more of hospitality, car rental, passenger transport, air cargo, cargo, and a perishable asset industry.

5. The computer-implemented method of claim 1, further comprising manipulating the price profile of the selected one or more optimized price recommendations and displaying on a graphical user interface what price should be charged at a current time and what prices should be charged at a later time, wherein the later time is before a consumption start date.

6. The computer-implemented method of claim 1, further comprising estimating how price impacts demand, the profits, or the market share and maximizes the revenue, using price sensitive forecasting.

7. The computer-implemented method of claim 1, further comprising providing a rate menu comprising a list of all rates to be booked, along with a specification of a relationship between the rates and rules on how the rates should be established.

8. A system, comprising:
one or more reservation systems coupled with a computer system over a communications network comprising a processor and a memory, the computer system configured to:
receive bookings data, inventory data, capacity data, forecast data, current prices, and competitor rate data in market reference prices over the communications network from the one or more reservation systems;

receive one or more model parameters and one or more penalties that control a proximity of a price recommendation over the communications network from the one or more reservation systems, the one or more model parameters including one or more of a baseline demand forecast, competitive intelligence, relative weighting, inventory data parameters, data representing real-world objects, and model configuration parameters;

receive one or more business objectives over the communications network from the one or more reservation systems, the one or more business objectives including one or more of a return on inventory, revenue, profits, and market share;

determine industry-agnostic optimized price recommendations for a specific configurable time period at a resource level or a package of resources level based on the one or more model parameters, the one or more penalties, the one or more business objectives, and the market reference prices;

select one or more of the optimized price recommendations for the specific configurable time period;

determine a price profile based on the selected one or more optimized price recommendations for the specific configurable time period;

automatically upload recommended rates based on the price profile over the communications network to the one or more reservation systems;

invoke a constrained forecast evaluator subsequent to the determination of the optimized price recommendations and automatic upload of recommended rates, wherein the constrained forecast evaluator takes the bookings data and the forecast data and simulates accepting the bookings data at the current prices and the selected one or more optimized price recommendations based on available capacity;

compare, through the constrained forecast evaluator, expected bookings and the one or more business objectives at the current prices with the price profile based on the selected one or more optimized price recommendations for the configurable time period;

override the optimized price recommendations subsequent to review of the constrained forecast evaluator simulation, wherein the override is based on criteria comprising specific knowledge, business requirements; the one or more business objectives, and predicted activities; and upload the overridden optimized price recommendations to the one or more reservation systems.

9. The system of claim 8, wherein the computer system is further configured to invoke the constrained forecast evaluator and simulate an implementation of the selected one or more optimized price recommendations to arrive at a projection for revenues and total bookings.

10. The system of claim 8, wherein the computer system is further configured to manipulate the price profile of the selected one or more optimized price recommendations and display on a graphical user interface what price should be charged at a current time and what prices should be charged at a later time, wherein the later time is before a consumption date.

11. The system of claim 8, wherein the computer system is further configured to estimate how price impacts demand, the profits, or the market share and maximizes the revenue, using price sensitive forecasting.

12. The system of claim 8, wherein the computer system is further configured to receive user input to accept, reject or change the optimized price recommendations.

13. The system of claim 8, wherein the computer system is further configured to provide a rate menu comprising a list of rates to be booked, along with a specification of a relationship between the rates and rules on how the rates should be established.

* * * * *